UNITED STATES PATENT OFFICE.

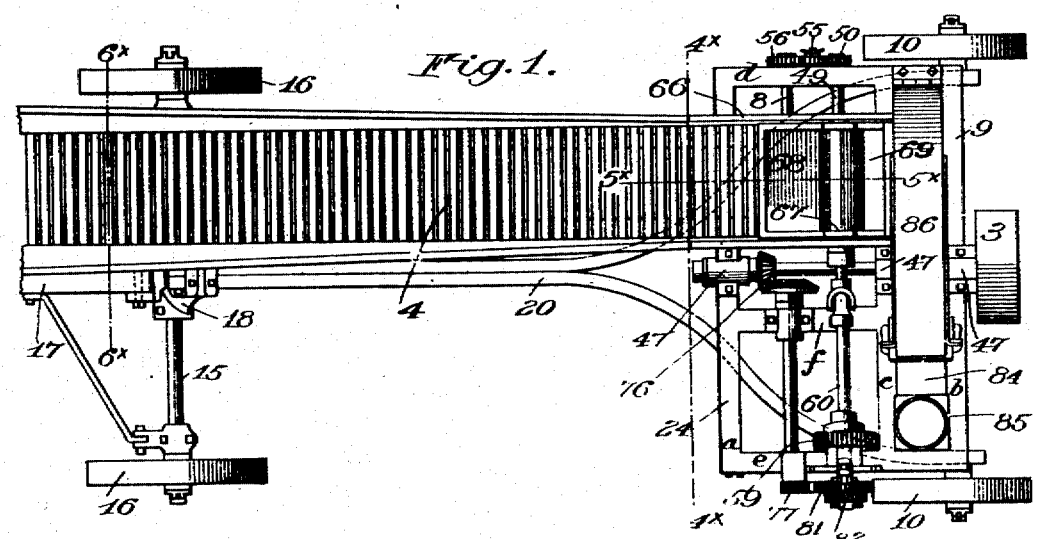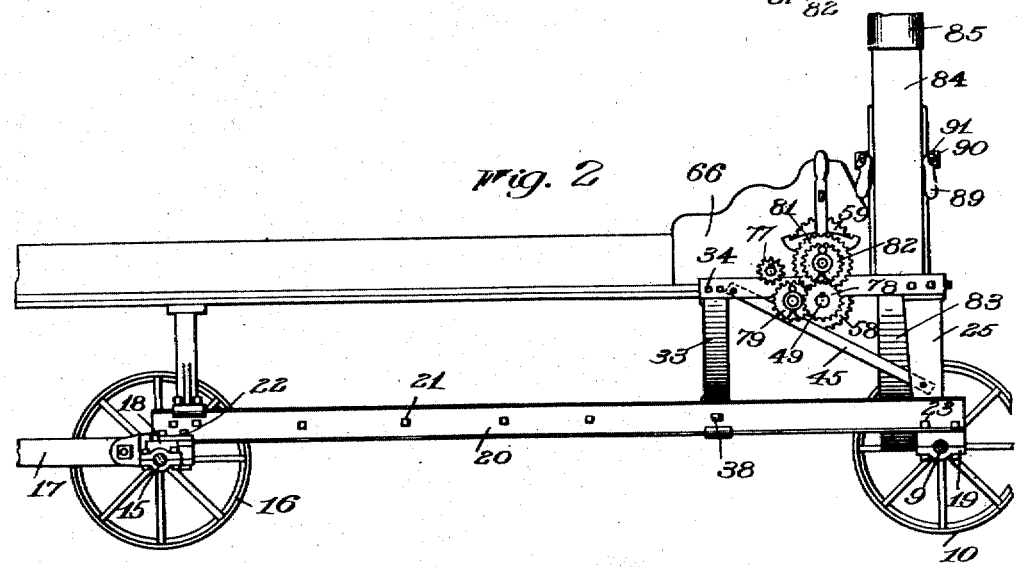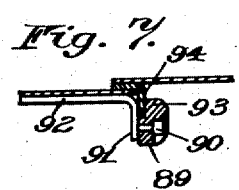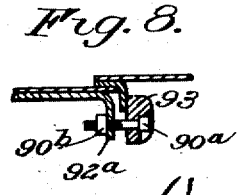

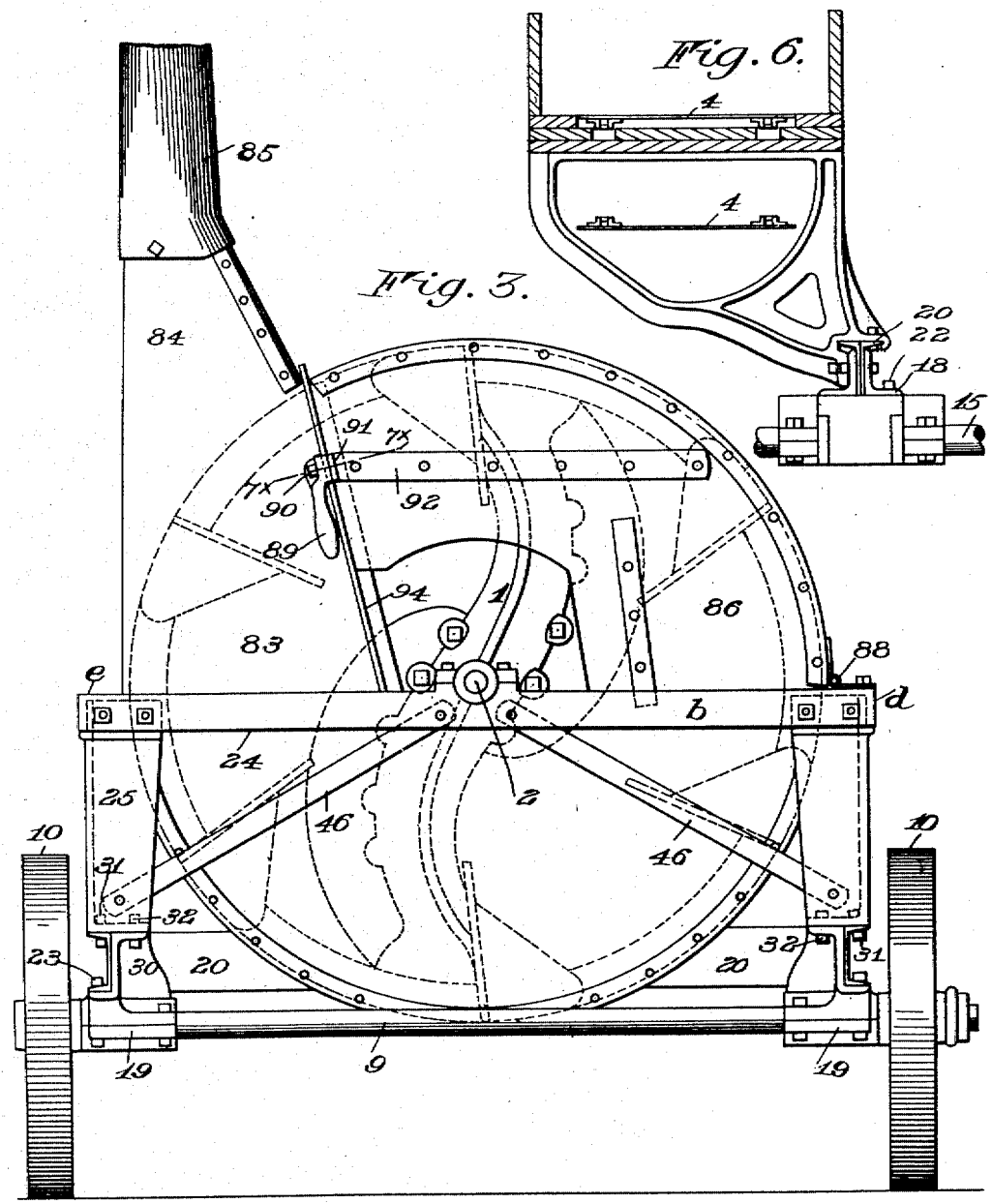

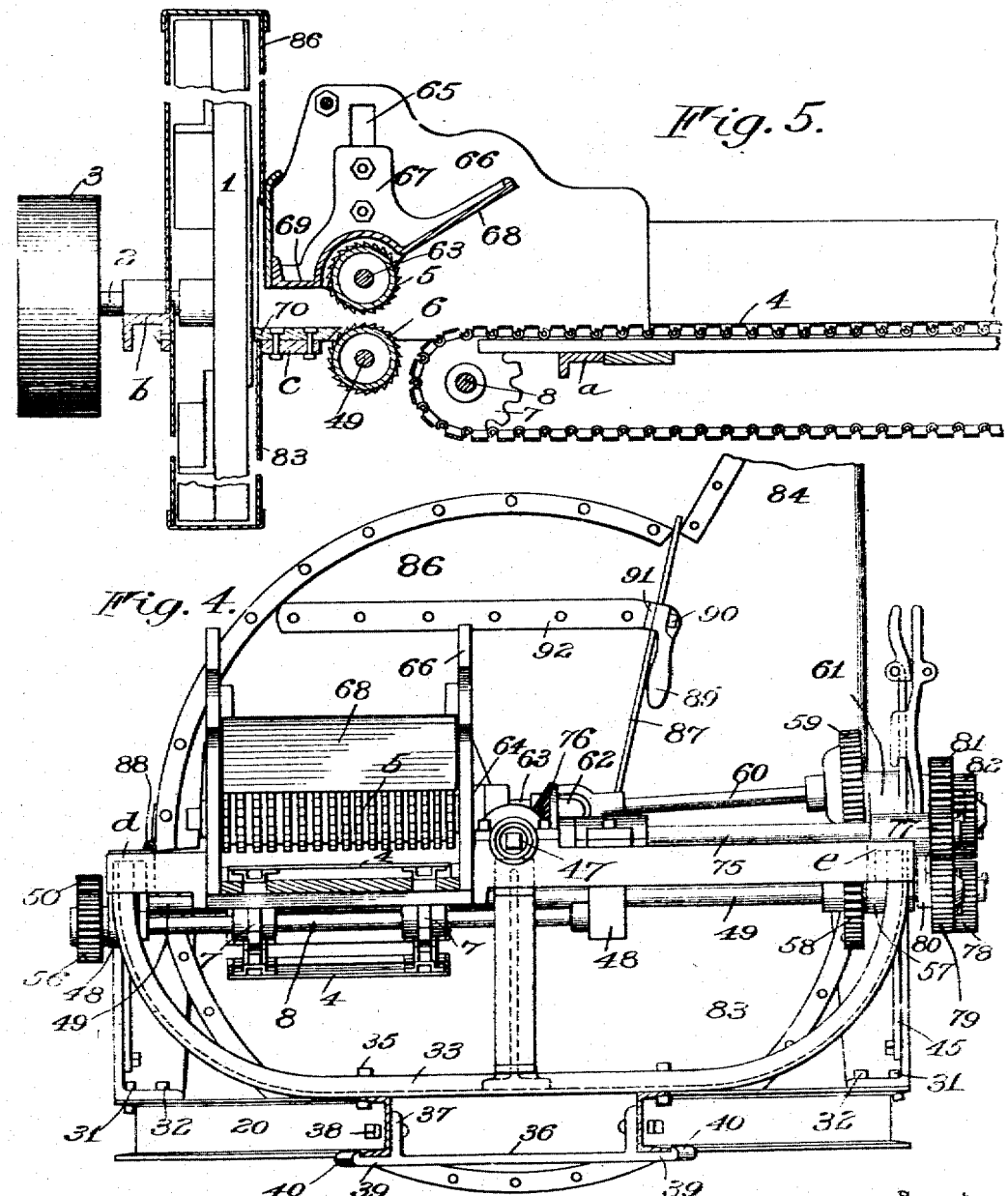

WARD H. PRESTON, OF LIMA, NEW YORK, ASSIGNOR TO PAPEC MACHINE CO., OF LIMA, NEW YORK, A CORPORATION OF NEW YORK.

ENSILAGE-CUTTER.

984,155.  Specification of Letters Patent.  Patented Feb. 14, 1911.

Application filed July 21, 1906. Serial No. 327,147.

*To all whom it may concern:*

Be it known that I, WARD H. PRESTON, of Lima, in the county of Livingston and State of New York, have invented certain new and useful Improvements in Ensilage-Cutters; and I do hereby declare the following to be a full, clear, and exact description of the same, reference being had to the accompanying drawings, forming a part of the specification, and to the reference-numerals marked thereon.

My present invention relates to machines for preparing silage or ensilage from either dry or green fodder and it has for its object to provide certain improvements in the construction and combination of parts of a machine of this character, all as will be more fully described hereinafter, the novel features being pointed out in the specification and set forth particularly in the claims appended hereto.

In the drawings: Figure 1 is a top plan view of the machine constructed in accordance with my invention. Fig. 2 is a side elevation thereof. Fig. 3 is an enlarged rear end elevation. Fig. 4 is an enlarged cross sectional view taken on the line 4× 4× of Fig. 1, showing the forward side of the cutter drum and the feeding mechanism located in front of it. Fig. 5 is an enlarged longitudinal sectional view taken on the line 5× 5× of Fig. 1. Fig. 6 is a cross sectional view taken on the line 6× 6× of Fig. 1, showing the bracket supporting the front end of the conveyer. Fig. 7 is a detail view taken on the line 7× 7× of Fig. 3, illustrating the construction of the catch employed for locking the cutter hood, and Fig. 8 is a similar view illustrating the modification of the catch.

Similar reference numerals in the several figures indicate similar parts.

In illustrating my invention I have shown it in connection with a machine adapted to be used for cutting fodder, comprising a rotary cutting head 1 mounted on a shaft 2, provided with a driving pulley 3, adapted to be connected by a belt or other driving device to any desired form of motive power, the material to be operated upon, such as corn stalks, hay, vines, etc., being fed to the cutter by a conveyer 4, having its inner end located in proximity to a pair of feeding rolls 5 and 6 and which is supported upon sprocket wheels 7 carried on a shaft 8, said rolls and shaft being rotated continuously by suitable driving devices operated by the shaft 2. It is usual in the construction of machines of this character to mount the various parts thereof upon a stationary frame, but as the character of the work performed by the machine necessitates its being set up and operated in proximity to the silo, or receptacle in which the ensilage is deposited and packed, it is desirable to mount the apparatus upon a suitable carriage or truck whereby it may be conveniently transported from place to place. To this end I have provided a suitable arrangement of the various parts of the machine, whereby it may be mounted upon wheels and the rotary parts operated in a direction so that the pull of the driving belt will not cause the machine to travel out of its set position, and I also construct the supporting frame in such a manner that both the forward and rear ends of the conveyer may be rigidly held in operative position and access permitted to either side thereof.

In carrying out my invention, I have employed a rear axle 9 supported in the wheels 10 and a forward axle 15 supported in wheels 16, to which the usual draft appliances comprising a tongue or pole 17 are connected. The forward and rear axles are connected by a reach, the forward end thereof being connected to a casting 18, forming one of the parts of the fifth wheel, from which it extends rearwardly having its rear end bifurcated, forming two side pieces which are curved outwardly and rearwardly, as shown in Fig. 1, and are attached to the rear axle by split clamping members 19. The axles extending transversely of the reach member constitute supports therefor and may also be considered a part of the bottom frame and the wheels the mounting for said frame, as it is obvious that these may be slipped off the ends of the axles and other means employed for holding the bottom frame at the desired elevation. In constructing the reach member I preferably employ two similarly shaped channel bars 20, the forward parallel portions of which may be rigidly bolted together as indicated at 21, their bottom flanges being adapted to receive the bolts 22, by which they are connected to the pivotal member 18 at their forward ends, and the bolts 23 which secure them to the clamps 19, at their rear ends.

The reach members constitute a lower supporting frame for the machine and surmounting this is an upper or supplemental frame 24, on which the movable parts of the apparatus are journaled. The frame 24 is supported at its rear corners upon brackets 25 resting upon the upper flanges of the reach pieces and the upwardly extending shoulders 30 of the clamps 19 to which the brackets are attached by bolts 31 and 32 respectively. The forward end of the frame is also supported upon a saddle piece 33, spanning the reach pieces in rear of their diverging point, having the upwardly curved ends projecting into sockets in the corners of the frame and secured to the latter by bolts 34. The diverging ends of the reach member are preferably secured to the saddle piece 33 by bolts 35 and at this point their lower edges are prevented from spreading or twisting by a cross bar 36 having ears 37 to which they are attached by bolts 38, said bar being also provided with outwardly extending feet 39 having upwardly extending ears or lugs 40, embracing the edges of the lower flanges of said ends. The frame 24 is further braced by tie rods 45 arranged at each side and extending diagonally from its forward corner to the lower end of the bracket 25, as shown in Fig. 2, and tie rods 46, extending from said bracket to the center of the rear side bar of the frame, as shown in Fig. 3.

The frame 24 comprises the forward and rear side bars $a$ and $b$, and an intermediate cross bar $c$, which extend transversely of the lower frame, and are connected by end pieces $d$ and $e$; also extending between the bars $a$ and $c$ is a strut $f$. The driving shaft 2 extends longitudinally of the bottom frame, or reach member, and is located centrally thereof on the frame 24, being journaled in suitable bearings 47 on the cross bars $a$, $b$ and $c$ with its axis extending at a right angle to the axes of the supporting wheels 10 and 16. By this arrangement of the parts it will be seen that the diameter of the cutting head 1 is only limited by the distance between the side pieces $d$ and $e$, of the upper frame, and that as its lower edge is accommodated by the spreading of the side members of the lower frame, it may be located in a position to bring the surface of the coöperating conveyer at a convenient height for the operator. The supplemental frame 24 carrying the bearings in which the rotary cutter is journaled surmounts the lower or bottom frame, composed of the side members 20 and their forward and rear transversely extending supporting members 15 and 9, and is so disposed that the bearing carrying the outer end of the shaft may be located directly above the rear supporting member 9. This arrangement insures great stability to the parts, as it permits the cutting head 1 to be located in the space included between the separated ends of the side pieces or members and in proximity to the member 9 where it is protected during transportation. The cutting head 1 is massive and heavy in weight and for efficient operation it must rotate on bearings which are true and so arranged that they are not affected by any tendency to spring or other action which may be imparted to the vehicle frame either during operation or transportation. The stability thus imparted to the rearmost bearing also permits the driving pulley to be located in proximity thereto in rear of the rear axle so that the pull on the driving belt on said pulley at one side of the plane of the axle is counteracted by the cutting head located at the other side thereof. Further, this arrangement of the parts permits the whole frame of the machine to be located a short distance above the plane of the wheel axles which reduces the tendency of the machine to vibrate to a minimum.

The conveyer 4 is arranged at one side of the shaft 2 and the shaft 8 carrying the sprocket wheel 7 supporting its forward end is journaled in bearings 48 depending from the parts $d$ and $f$ of the frame 24, as are also the bearings (not shown) supporting the shaft 49 of the lower feed roll 6, one end of which is provided with a pinion 50 engaging an idler 55 which meshes with a gear wheel 56 on the shaft 8. The other end of the shaft 49 is supported in a bearing 57 depending from the side piece $e$ and is provided with a gear wheel 58, intermeshing with a gear wheel 59 on a shaft 60. The outer end of the latter is journaled in a rocking bearing 61 and its inner end is connected by a universal joint 62 to the shaft 63 on which the upper feed roller 5 is supported. The shaft 63 is journaled in bearings 64 movable vertically in slots or guides 65 formed in the side walls 66 inclosing the conveyer. Attached to the bearings 64 is a cover plate 67 having the upwardly flaring forward edge 68, for guiding the fodder and compressing it against the roll 5, and provided at its rear side is a shoulder or projection 69, arranged slightly above the lower side of the roll, adapted to form a presser foot which holds the material being operated upon against the shearing table or cutting bar 70, with which the knife blades of the cutter 1 coöperate. By making the upper feeding roll movable in a vertical direction it is capable of automatically adjusting itself to the quantity of fodder delivered by the conveyer. In practice the roller and the cover plate are given sufficient weight to hold the fodder against the lower roll 6 and thus obviate the use of springs or other pressure mechanism.

Suitable devices may be employed for rotating the feed rolls. Those shown comprising a counter shaft 75 connected by bevel pinions 76 to the driving shaft 2 having at its outer end a pinion 77. Motion is transmitted from the latter to a pinion 78 arranged on the shaft 49 by adjustable speed mechanism, comprising a pinion 79 carried on an adjustable arm 80, said pinion meshing with a gear wheel 81 having on its outer face a gear wheel 82 meshing with the pinion 78.

The rotary cutting head 1 is inclosed within a cylindrical drum or casing 83, at one side of which is an upwardly extending spout 84 leading to the usual stack 85 through which the ensilage is discharged. In order to permit convenient access to the cutting head when for any reason it is desired to inspect or replace a part thereof, the upper part of the drum 83 is made removable, a division being made between the upper and lower parts of the side walls along the line 87, extending downwardly from the spout 84 and horizontally along the top of the frame 24, to which the part 86 is pivotally connected by a hinge 88. The internal pressure on the drum necessitates the removable section being locked securely when in a closed position. To accomplish this I have provided locking devices which are simple in construction and positive in operation comprising members 89, pivoted upon studs 90 on outwardly extending ends 91 of straps 92, attached to opposite sides of the part 86 of the drum. Each member 89 has a laterally projecting end 93 adapted to engage the outwardly extending flange of angle bars 94 attached to the sides of the stationary portion of the drum in proximity to its edges 87 and forming abutments thereon with which the locking members 89 coöperate.

If desired, the stud on which the locking members are pivoted may be arranged, as shown in Fig. 8, in which it is illustrated as comprising a bolt 90ª adjustable in a threaded aperture in the end of a strap 92ª and locked by a nut 90ᵇ.

The frame 24 is preferably formed of a casting in which the several parts $a, b, c, d, e$ and $f$ are integral as it possesses the advantage of being unaffected by vibration during the operation of the machine or other causes.

The bearings 47 carrying the driving shaft 2 are provided with the usual removable caps secured rigidly to the frame 24 by bolts, as shown, the lower halves of the bearings being formed by depressions in the face of the frame. The bearings for the shaft 75 are similarly formed on the frame.

It is a distinct advantage in a machine of this character to construct all of the parts of the supporting frame integrally in a single casing and to form the bearings of the driving shaft therein, as the cutting head 7 and the coöperating shearing table 70 may be properly adjusted in the first instance and will not be moved into inoperative positions by the twisting of the frame or springing of the bearings when the strain of the driving belt is exerted on the driving shaft.

By constructing the lower frame in the manner described it will be readily seen that the conveyer may be located to feed the fodder to the cutter at one side of its center and that one or more operators, or attendants, may stand in close proximity to either side thereof.

I claim as my invention—

1. In an ensilage cutter, the combination with a bottom frame having a narrow forward end and diverging rear ends forming side pieces, a saddle piece extending transversely of the latter and upwardly therefrom and top frame mounted at one edge on the saddle piece, of brackets on the side pieces supporting the other edge of the frame, cutting mechanism comprising a shearing table and a rotary cutter coöperating therewith journaled on the top frame and arranged to revolve in the space between said rear ends of the side pieces of said bottom frame, a laterally extending bracket projecting at one side of the forward end of said side pieces, a conveyer supported thereon at one end and arranged with its other end on the top frame in proximity to the shearing table and devices for driving the conveyer and cutter.

2. In an ensilage cutter, the combination with a bottom frame having a narrow forward end and diverging rear ends forming side pieces, a top frame supported on said side pieces, a rotary cutter journaled on the top frame, a shearing table coöperating therewith and arranged on the top frame at one side of the axis of the cutter, of a conveyer arranged in alinement with said table and extending longitudinally of the bottom frame and a bracket mounted on the latter and supporting one end of the conveyer, said narrow forward end of the bottom frame permitting convenient access to the conveyer and its diverging ends providing space in which the cutter rotates.

3. In a machine of the character described, the combination with a frame, a rotary cutter mounted thereon and extending above and below the frame and means for operating it, of a cylindrical drum inclosing the cutter and supported on the frame, and also extending above and below it, said drum comprising side walls and having an opening at one edge and an upwardly extending discharge spout leading therefrom, said side walls being divided to form a removable segmental portion of the drum lying above the frame and at one side of the spout, a hinge connection between the removable portion of the drum and the frame and locking devices for detachably securing the parts of the casing together.

4. In a machine of the character described the combination with a frame, a rotary cutter and means for operating it, of a drum inclosing the cutter having side walls and comprising a stationary and a relatively movable part, abutments on the side walls of one part and clamping members carried on the walls of the other part and detachably engaging the abutments to lock the movable parts of the casing in operative position.

5. In a machine of the character described the combination with a frame, a rotary cutter and means for operating it, of a drum inclosing the cutter having side walls and comprising a stationary and a relatively movable part; binding strips on the walls of one part having outwardly extending and clamping members for securing the straps to said flanges.

WARD H. PRESTON.

Witnesses:
G. WILLARD RICH,
RUSSELL B. GRIFFITH.